United States Patent [19]

Imai et al.

[11] Patent Number: 5,365,276
[45] Date of Patent: Nov. 15, 1994

[54] MULTISCREEN DISPLAY CIRCUIT FOR DISPLAYING VIDEO SIGNAL SOURCES HAVING DIFFERENT ASPECT RATIOS

[75] Inventors: Kiyoshi Imai, Kyoto; Yutaka Nio, Hirakata; Ken Sakamoto, Takatsuki; Keiya Miyoshi, Ikeda; Mitsuji Okawa, Toyonaka; Toyoaki Unemura, Itami, all of Japan

[73] Assignee: Matsushita Electric Industrial Co., Ltd., Osaka, Japan

[21] Appl. No.: 894,922

[22] Filed: Jun. 8, 1992

[30] Foreign Application Priority Data

Jun. 13, 1991 [JP] Japan .................. 3-141612

[51] Int. Cl.$^5$ ............ H04N 5/46; H04N 5/262; H04N 5/445
[52] U.S. Cl. .................. 348/556; 348/564
[58] Field of Search .......... 358/188, 140, 181, 230, 358/183, 556, 563, 564, 555, 558, 567, 568; H04N 5/46, 7/01, 5/262, 5/265, 5/44, 5/445, 5/45

[56] References Cited

U.S. PATENT DOCUMENTS

| | | | |
|---|---|---|---|
| 4,984,078 | 1/1991 | Skinner | 358/140 |
| 5,029,326 | 7/1991 | Tabata | 358/12 |
| 5,065,243 | 11/1991 | Katagiri | 358/140 |
| 5,146,335 | 9/1992 | Kim et al. | 358/140 |
| 5,159,450 | 10/1992 | Senso et al. | 358/140 |
| 5,161,012 | 11/1992 | Choi | 358/183 |
| 5,166,801 | 11/1992 | Yoshikawa | 358/230 |

FOREIGN PATENT DOCUMENTS

| | | | |
|---|---|---|---|
| 57-208772 | 12/1982 | Japan . | |
| 258578 | 11/1986 | Japan | H04N 5/45 |
| 258580 | 11/1986 | Japan | H04N 5/45 |
| 013173 | 1/1987 | Japan | H04N 5/45 |
| 273489 | 11/1989 | Japan | 358/183 |
| 0309771 | 12/1990 | Japan | H04N 5/265 |
| 0106280 | 5/1991 | Japan | H04N 7/01 |
| 1019387 | 12/1991 | WIPO | H04N 5/262 |

OTHER PUBLICATIONS

Tsuji et al., "Multi-Functioning of Clear Vision Adapted Television Receiver", 1990 Television Association Annual Convention Pre-View 20-11, pp. 357-358.

Sugimoto, et al., "Digital Processing Technology in Television 6. Special Effect", Television Association paper, vol. 33, No. 4, pp. 301-310, 1979.

Primary Examiner—Mark R. Powell
Assistant Examiner—Chris Grant
Attorney, Agent, or Firm—Stevens, Davis, Miller & Mosher

[57] ABSTRACT

The present invention sequentially selects and outputs one of a plurality of video image sources 1 by an image signal source switching means 2, processes the video images by thinning circuit portions 3 and 4, writes in the video data into an image memory 5 and display the images on an image display device 6. Depending upon the detection output of an aspect ratio detecting circuit portion 12, which detects an aspect ratio of an image display of each of the video image source 1, thinning ratios of the thinning circuits 3 and 4 and a write in control circuit portion 9 for the image memory are switched in order to obtain a multiscreen display circuit which can display video signal sources having different aspect ratios.

6 Claims, 9 Drawing Sheets (HORIZONTAL 1/3 THINNING / VERTICAL 1/3 THINNING)

(HORIZONTAL 1/4 THINNING / VERTICAL 1/4 THINNING)

(HORIZONTAL 1/4 THINNING
VERTICAL 1/3 THINNING)

(HORIZONTAL 1/3 THINNING / VERTICAL 1/3 THINNING)

(HORIZONTAL 1/3 THINNING)
(VERTICAL 1/3 THINNING)

(HORIZONTAL 1/3 THINNING / VERTICAL 1/3 THINNING)

MULTISCREEN DISPLAY CIRCUIT FOR DISPLAYING VIDEO SIGNAL SOURCES HAVING DIFFERENT ASPECT RATIOS

BACKGROUND OF THE INVENTION

The present invention relates to a multiscreen display circuit for dividing a display screen into a plurality of sub-screens so as to assign a plurality of available video signal sources to respective sub-screens so as to simultaneously display still images while updating the contents of the images in order with, current information, as one optional function of a television receiver.

In recent years, since image memories have become available at relatively low cost, television receivers including memory for one image field are increasing. In such television receivers, multiscreen display function is frequently provided as one of optional functions. This function corresponds to increasing the video signal sources and allows unitary still image display, in field feeding mode, for monitoring current programs broadcasted from ground broadcasting stations and satellite broadcasting stations so as to find preferred programs.

FIG. 7 is a conceptual illustration of a television receiver including a multiscreen display function for displaying information from a plurality of video signal sources. In the shown example, a video monitor screen is divided into nine sub-screens, in which are displayed six programs from ground broadcasting stations and two programs from satellite broadcasting stations and one program from a package-type medium input through a video terminal. On such sub-screens, respective selected video signal sources are tuned, in order from the channel No. 2 at the left upper sub-screen so as to obtain respective one field wide information for still image display.

Tsuji et al. "Multi-Functioning of Clear Vision Adapted Television Receiver", 1990 Television Association Annual Convention Pre-View 20-11, PP357~358, discusses a television receiver having a "channel search" function for multiscreen display by dividing the overall screen into 9/16 sub-screens and a "video search" function for overlapping right three sub-screens in FIG. 7 on normal dynamic image display. On the other hand, Sugimoto et al. "Digital Processing Technology in Television 6. Special Effect", Television Association Paper Vol. 33, No. 4 (1979), PP 301~310, discusses, in detail, about basic operation of a multiscreen display circuit (multi-freeze).

Discussion will be given herebelow about conventional multiscreen display circuits with reference to FIGS. 7 to 11. FIG. 10 is a block diagram of the conventional multiscreen display circuit. In FIG. 10, the reference numeral 1 denotes input terminals for video signal sources, 2 denotes a video signal source switching means for selecting one of a plurality of input terminals 1 for the video signal sources for outputting video signals therefrom, 3 denotes a horizontal thinning circuit portion connected to the output end of the video signal source switching means 2, 4 denotes a vertical thinning circuit portion connected to the output end of the horizontal thinning circuit portion 3, 5 denotes a display memory connected to the output end of the vertical thinning circuit portion 4, 6 denotes an image display device, such as CRT, connected to the output end of the image memory 5, 7 denotes a synchronization signal generating circuit portion for controlling horizontal and vertical synchronization, 8 denotes a read out control circuit portion for performing read out control according to horizontal and vertical synchronization signals from the synchronization signal generating circuit portion 7, 9 denotes a writing in control circuit portion for controlling writing of video signal in the video memory 5, 10 denotes a synchronization signal reproduction circuit portion for reproducing and supplying the horizontal and vertical synchronization signals of the video signal selected by the video signal source switching means 2 to the write in control circuit portion 9, and 11 denotes a signal switching control portion for switching of the video signal sources according to feeding of multiscreen display.

With respect to the multiscreen display circuit having the construction as set forth above, the operation will be discussed herebelow. The video signal source switching means 2 is controlled by the signal switching control portion 11 to select the input terminals 1 for the video signal sources, in order, according to the field feeding speed of the multiscreen display. Typical switching speed is approximately a one second interval. Since the amount of information to be written in the image memory 5 corresponds one field or one frame, further higher speed switching may be possible. However, in the practical view point, for reducing the amount of circuitry by commonly using the signal processing circuit among different signal sources, switching response time of the signal processing circuit (tuner, video signal processing, synchronization signal processing and so forth) has to be taken into account. It should be appreciated that the video signal source switching circuit 2 is illustrated as incorporating such signal processing circuit.

The horizontal thinning circuit portion 3 and the vertical thinning circuit portion 4 are the circuits for thinning the number of pixels in the horizontal direction and number of scanning lines in the vertical direction. In case of FIG. 7, in which the screen is divided into nine sub-screens, thinning is performed for one third in the vertical and horizontal directions. In the practical circuit construction, these circuits comprise a low pass filter for suppressing spatial folding distortion and a filter for spatially interleaving thinned pixels from the input signal. Final screen size compression is performed upon writing in the image memory 5. It should be noted that, in the following discussion, the ratio of thinning represents the thinning in the spacial sense. When the video signal source is an interlace signal of 262.5 lines/field, a display device A employs an interlace scanning of 262.5 lines/field, and a display device B employs an interlace scanning of 525 lines/field, thinning one line per four scanning lines from the video signal source with respect to the display device A and thinning one lines per two scanning lines of the video signal source with respect to the display device B has the same meaning spacially since both are thinning one fourth in the spacial ratio.

Operations of horizontal thinning circuit portion 3, vertical thinning circuit portion 4 and the image memory 5 will be discussed with reference to FIGS. 11A to 11D. FIGS. 11A to 11D are explanatory illustrations showing video signal processing in the conventional multiscreen display circuit. FIG. 11A shows the video signal output from the video signal source switching means 2, which contains an information for a true circle image at the center as displayed in the aspect ratio of horizontal 4: vertical 3. For the net input video signal, from which the fly-back component and the over-scanning component are removed, the horizontal scanning period is indicated as HI and the vertical scanning period is indicated as VI. In FIG. 11B, the image of thinning operation for one third by the horizontal thinning circuit portion 3 and the vertical thinning circuit portion 4 is illustrated at the left upper corner portion. After thinning, the information actually written in the image memory 5 is those for the pixels indicated in black at the intersections of the matrix form thinning patterns.

Writing operation for the image memory by the write in control circuit portion 9 will be discussed with reference to FIGS. 11C and 11D. FIG. 11D shows the memory space of the image memory 5. Corresponding to FIG. 7, the memory space is divided into three sections, i.e. h, 2h and 3h in the horizontal direction and into three sections, i.e. v, 2v and 3v in the vertical direction and thus divided into nine memory sections. The pixels of HW in the horizontal direction and VW in the vertical direction are written in the memory space at (0, 0) to (h, v) of the image memory 5 in the example of FIGS. 11A to 11D. At this time, other sections of the image memory 5 are maintained unchanged. Subsequently, the next video signal source is selected by the video signal source switching means 2. Through the similar process, the information is written in the memory section of (h, 0) to (2h, v). By repeating the similar process, information of the images of the nine video signal sources are written in respective memory sections. Next, discussion will be given for control of the read out control circuit 8. The region to be read out and displayed on the image display device 6, is the HR period in the horizontal direction and VR period in the vertical direction. The read out control circuit portion reads out image memory 5 irrespective of the write in control circuit portion 9. By this, the contents of the image memory 5 except for the portion to be updated, are displaced on the image display device 6 in a form of still images in overall screen.

It should be appreciated that the shown construction can be adapted for aspect ratios of either horizontal 4:vertical 3 or horizontal 16:vertical 9. FIG. 8 shows an example of division of screen of the image display device 6 in horizontal 4:vertical 3 (horizontal 12:vertical 9) in the prior art, and FIG. 9 shows another example of division of screen of the image display device 6 in horizontal 16:vertical 9 in the prior art.

SUMMARY OF THE INVENTION

In the future, an increase in the number of video signal sources having horizontally elongated aspect ratios, such as HDTV, EDTV or VCR relative to the conventional aspect ratio of horizontal 4:vertical 3 is expected. In the foregoing construction in the prior art, the thinning circuits and the write in control circuit for the image memory are designed to perform only fixed operations and cannot be adapted for multiscreen display of a plurality of video signal sources having different aspect ratios.

In view of the problem set forth above, it is an object of the present invention to provide a multiscreen display circuit which can display various video signal sources having different aspect ratios, such as NTSC signal, HDTV signal or so forth.

In order to accomplish the above-mentioned object, a multiscreen display circuit, according to the present invention, comprises:

video signal source switching means (2) for selecting one of a plurality video signal sources as an input;

a circuit portion (3, 4) connected to the output of the video signal source switching means;

an image memory (5) connected to the output of the thinning circuit portion;

image displaying means (6) connected to the output of the image memory;

an aspect ratio detecting circuit portion (12) for detecting the aspect ratio of image display of each video signal source output from the video signal switching means; and the thinning ratio of the thinning circuit portion and write in control for the image memory operating in response to a detection output of the aspect ratio detecting circuit portion.

By employing the multiscreen display circuit according to the present invention, it becomes possible to perform multiscreen display for the video signal sources having different aspect ratios in the following five manners.

(1) The memory space of the image memory is divided into sub-screens having an aspect ratio of horizontal 4:vertical 3 corresponding to a plurality of the video signal sources and writing in, and the write in control is switched so that 1/N of horizontal period at both ends of the display screen is not written in when the aspect ratio detecting circuit portion detects a horizontally elongated video signal.

(2) The memory space of the image memory is divided into sub-screens having an aspect ratio of horizontal 4:vertical 3 corresponding to a plurality of the video signal sources and writing in, and the write in control is switched so that the thinning ratio of the thinning circuit is switched to a greater ratio and writing to the image memory is delayed for 1/N of the vertical period of the sub-screen when the aspect ratio detecting circuit portion detects a horizontally elongated video signal.

(3) The memory space of the image memory is divided into sub-screens having an aspect ratio of horizontal 4:vertical 3 corresponding to a plurality of the video signal sources and writing in, and the write in control is switched to switch a horizontal thinning ratio to be greater when the aspect ratio detecting circuit portion detects a horizontally elongated video signal.

(4) The memory space of the image memory divided into sub-screens having an aspect ratio of horizontal 4:vertical 3 corresponding to a plurality of the video signal sources and writing in, and the write in control is switched to assign horizontally adjacent two sub-screen regions of the image memory for the video image for which the aspect ratio detecting circuit portion detects a horizontally elongated aspect ratio.

(5) The memory space of the image memory divided into sub-screens having an aspect ratio of horizontal 16:vertical 9 corresponding to a plurality of the video signal sources and writing in, and the write in control is switched so as to limit writing in the image memory at the central ¾ of the horizontal period of the sub-screen region when the aspect ratio detecting circuit portion detects the video signal source having the aspect ratio of horizontal 4:vertical 3

DESCRIPTION OF THE PREFERRED EMBODIMENT

Embodiments of a multiscreen display circuit according to the present invention will be discussed herebelow with reference to FIGS. 1 to 6D.

Figure 1:
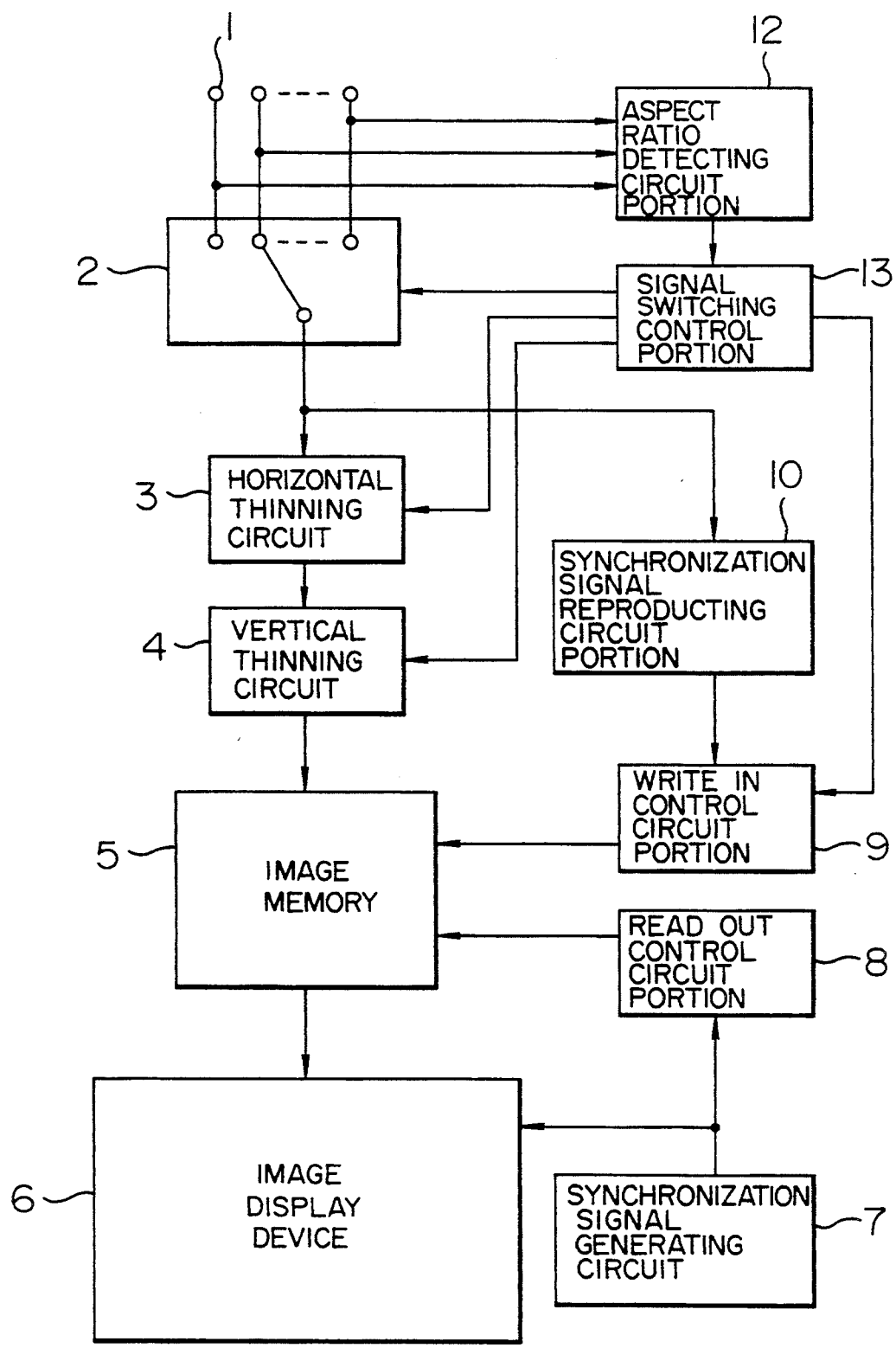
FIG. 1 is a block diagram of one embodiment of a multiscreen display circuit according to the present invention.
Figure 10:
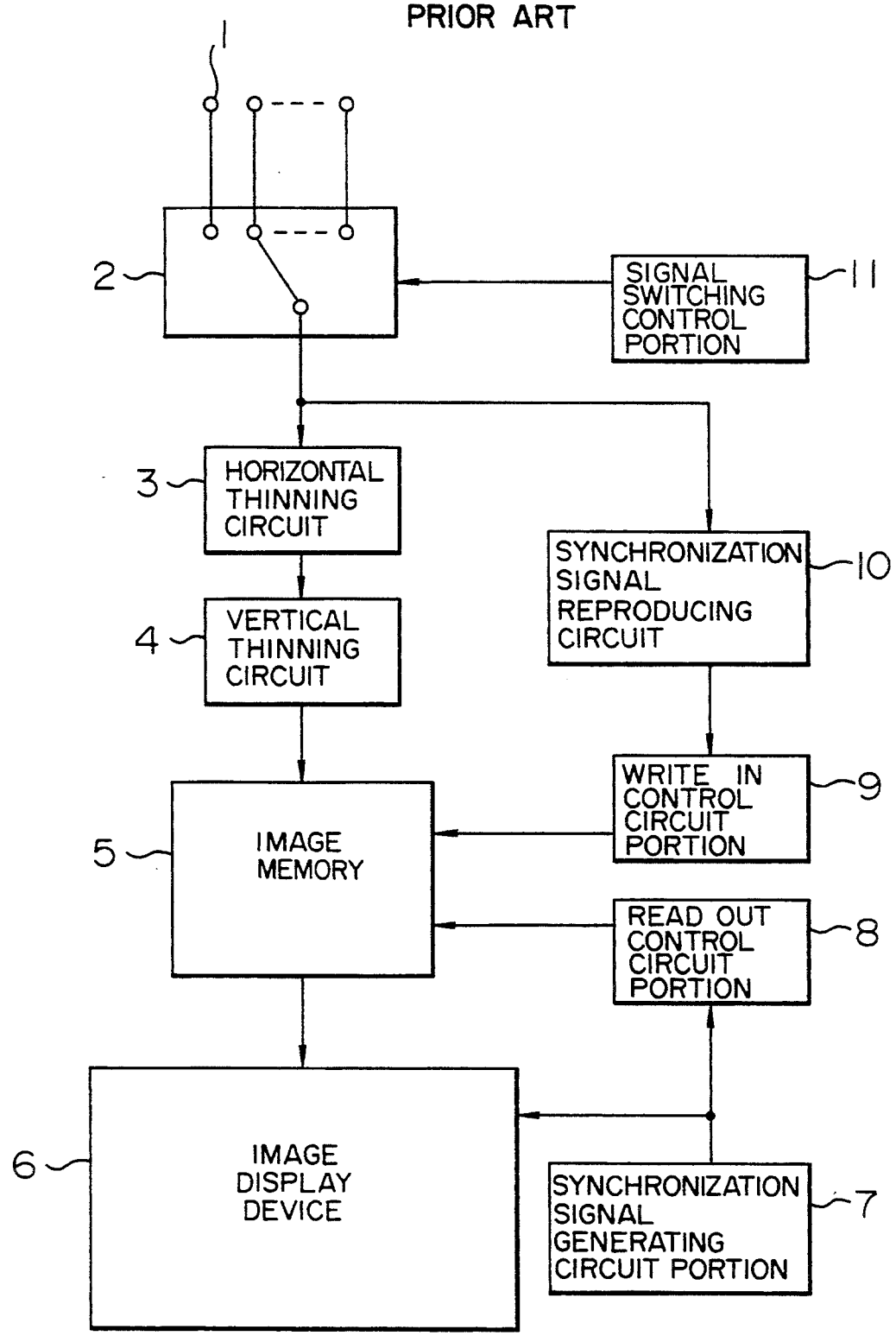
FIG. 10 is a block diagram of the conventional multiscreen display circuit.
Figure 11A:
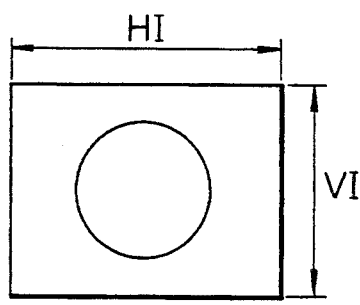
FIG. 11A is an illustration showing an example of image at an input terminal of a video signal source of the multiscreen display circuit, in a video signal processing step in the conventional multiscreen display circuit.
Figure 11B:
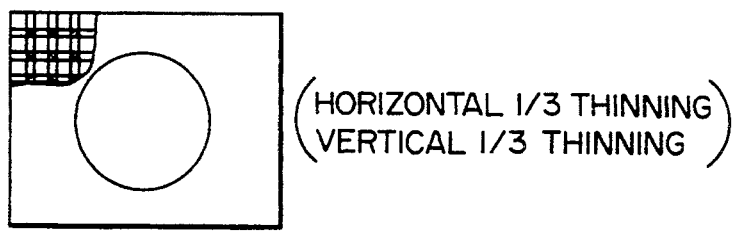
FIG. 11B is an illustration showing a principle of operation of horizontal and vertical thinning circuit portion of the multiscreen display circuit, in a video signal processing step in the conventional multiscreen display circuit.
Figure 11C:
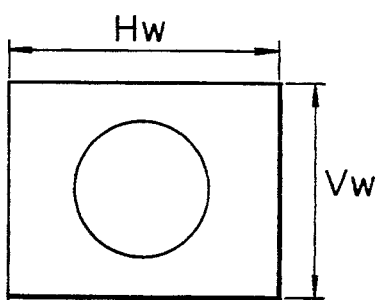
FIG. 11C is an illustration showing image writing in region of an image memory of the multiscreen display circuit, in a video signal processing step in the conventional multiscreen display circuit.
Figure 11D:
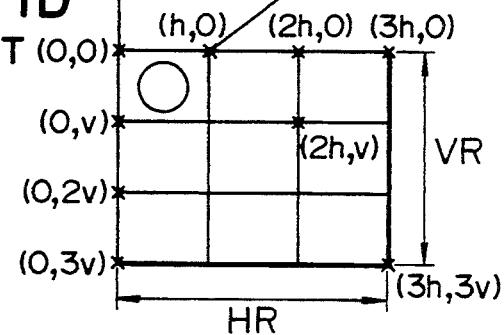
FIG. 11D is an illustration showing a memory space of the image memory of the multiscreen display circuit, in a video signal processing step in the conventional multiscreen display circuit.

FIG. 1 is a block diagram showing one embodiment of the multiscreen display circuit according to the invention. In FIG. 1, 1 denotes an input terminal of a video signal source, 2 denotes a video signal source switching means, 3 denotes a horizontal thinning circuit portion, 4 denotes a vertical thinning circuit portion, 6 denotes an image display device, 7 denotes a synchronization signal generating circuit portion, 8 denotes a read out control circuit portion, 9 denotes a writing in control circuit portion, and 10 denotes a synchronization signal write in control circuit portion. These components have the same construction to those in the prior art of FIG. 10 and represented by the same reference numerals. The reference numeral 12 denotes an aspect ratio detecting circuit portion for detecting an aspect ratio of each video signal source inputted through the video signal source input terminal 1, 13 denotes a signal switching control portion connected to the output end of the aspect ratio detecting circuit portion 12 and controlling the video signal source switching means 2, the horizontal thinning circuit portion 3, the vertical thinning circuit portion and the write in control circuit portion 9.

The operations of the multiscreen display circuit constructed as set forth above will be discussed herebelow with reference to FIGS. 2A to 6D. FIGS. 2A to 6D shows the process of video signal processing of embodiments of the multiscreen display circuit according to the invention.

First Embodiment

The aspect ratio detecting circuit portion 12 preliminarily detects respective aspect ratios of respective video signal sources connected to respective video signal source input terminals 1. Horizontally elongated video signal sources, such as HDTV, wide aspect EDTV, VCRS having special recording systems or so forth have means for transferring identifier signals indicative of horizontally elongated video signal source, to the receiver. The aspect ratio detecting circuit portion 12 determines that a video signal source has the horizontally elongated aspect ratio when such identifier signal is detected and, otherwise determines that the video signal source has the standard aspect ratio of horizontal 4:vertical 3. The aspect ratio detecting circuit portion 12 then feeds the results of the determination to the signal switching control portion 13. The signal switching control portion 13 stores the information of the aspect ratio from the aspect ratio detecting circuit portion 12 with respect to each input terminal of the video signal source switching means 2. Then, the signal switching control portion 13 controls write in control circuit portion 9 for switching in synchronism with switching control for the video signal source switching means 2 corresponding to the information of the aspect ratio. Hereafter, operation will be discussed with reference to FIGS. 2A to 2D, separately for the cases where the aspect ratio is horizontal 4:vertical 3 and horizontal 16:vertical 9.

At first, discussion will be given for the case where the signal switching control portion 13 selects the video signal source, for which the aspect ratio detecting circuit portion 12 determines that the video signal source has the aspect ratio of horizontal 4:vertical 3. The memory space of the image memory 5, as illustrated in FIG. 2D, is divided into four sections in the horizontal direction and three sections in the vertical direction so as to be divided into twelve sub-screens respectively having horizontal 4:vertical 3 aspect ratio. Accordingly, in the case of the video signal source having an aspect ratio of horizontal 4:vertical 3, the image information can be written in one of the memory space of the image memory 5 corresponding to one of the sub-screens of FIG. 2D having an aspect ratio of horizontal 4:vertical 3, by controlling the horizontal thinning circuit portion 3, vertical thinning circuit portion 4 and write in control circuit portion 9 substantially in the same manner to that in the prior art.

Figure 2A:
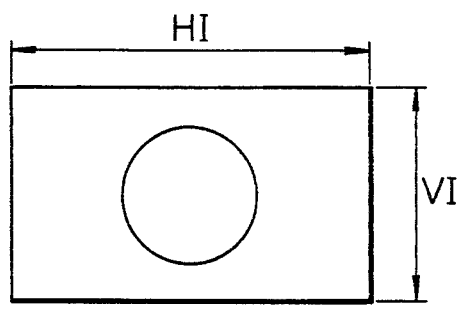
FIG. 2A is an illustration showing an example of image at an input terminal of a video signal source of the multiscreen display circuit, in a video signal processing step in the first embodiment of the multiscreen display circuit of the invention.
Figure 2B:
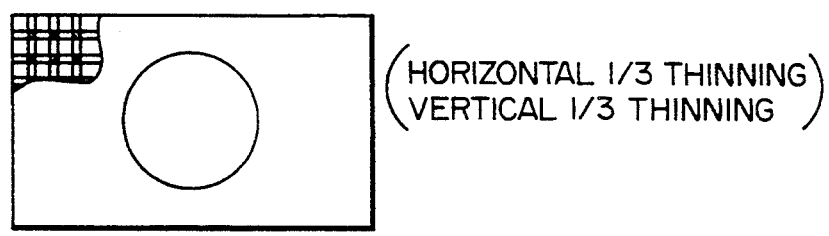
FIG. 2B is an illustration showing a principle of operation of horizontal and vertical thinning circuit portion of the multiscreen display circuit, in a video signal processing step in the first embodiment of the multiscreen display circuit of the invention.
Figure 2C:
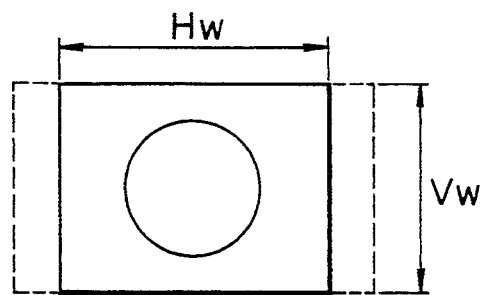
FIG. 2C is an illustration showing image writing in region of an image memory of the multiscreen display circuit, in a video signal processing step in the first embodiment of the multiscreen display circuit of the invention.
Figure 2D:
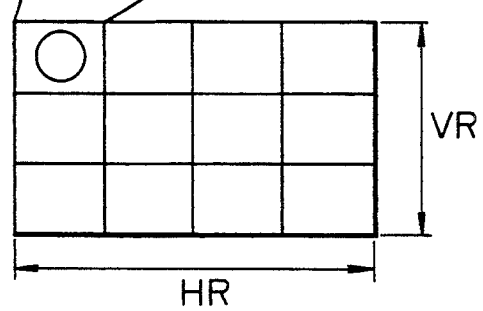
FIG. 2D is an illustration showing a memory space of the image memory of the multiscreen display circuit, in a video signal processing step in the first embodiment of the multiscreen display circuit of the invention.

Next, discussion will be given for the operation when the signal switching control portion 13 selects a video signal source which the aspect ratio detecting circuit portion 12 determines has an aspect ratio of horizontal 16:vertical 9, as shown in FIG. 2A. FIG. 2B shows an image of one third thinning operation in the horizontal thinning circuit portion 3 and vertical thinning circuit portion 4, at the upper left portion. What is actually written in the image memory 5 after thinning are the pixels indicated in black located at the intersection of matrix like thinning pattern. The image derived through this thinning operation may fit with respect to the height but does not fit in the horizontal width of the sub-screen of the image memory of FIG. 2D. Therefore, as illustrated in FIG. 2C showing the image writing in region for the image memory 5, the write in control circuit portion 9 is controlled so that the image information for the period HW excluding one eighth of the horizontal period is written in the image memory 5.

The operation of writing in the image information to the image memory 5 has been discussed hereabove. The operation for reading out the information from the image memory 5 is substantially the same as that in the prior art. In the reading out operation, according to the periods in the horizontal direction HR and the vertical direction VR, and the synchronization signal of the synchronization signal generating circuit portion 7, the read out control circuit portion 8 reads out the stored image information from the image memory 5 irrespective of the write in control circuit portion 9. By this, all fields except for the portion where the content of the image memory 5 is currently updated are displayed on the image display device 6 as still images.

It should be appreciated that the foregoing discussion is directed to the image display device 6 having an aspect ratio of horizontal 16:vertical 9. However, the foregoing process is equally applicable for the image display device 6 having an aspect ratio of horizontal 4:vertical 3. Also, it is possible to vary dividing rations of the image memory 5 while maintaining the aspect ratio of horizontal 4:vertical 3 of the sub-screens. In such case, the thinning ratio of the horizontal thinning circuit portion 3 and vertical thinning circuit portion 4 can be set so that the dividing ratio in the horizontal direction is made equal to that in the vertical direction. However, at certain dividing ratios, the memory spaces of the image memory 5 can become inconsistent with the image display regions. In such case, a background color, such as gray, will be displayed in the portion where the memory space of the image memory becomes inconsistent with the image display region.

Second Embodiment

Discussion of the second embodiment of the multiscreen display circuit according to the present invention will be discussed with reference to FIGS. 3A to 3D. Similarly to the foregoing first embodiment, the aspect ratio detecting circuit portion 12 detects the aspect ratio of the video signal source and transfers the information indicative of the aspect ratio to the signal switching control portion 13. The signal switching control portion 13 performs switching control for the horizontal thinning circuit portion 3, vertical thinning circuit portion 4 and write in control circuit portion 9 in synchronism with switching control of the video signal source switching means 2.

Figure 3A:
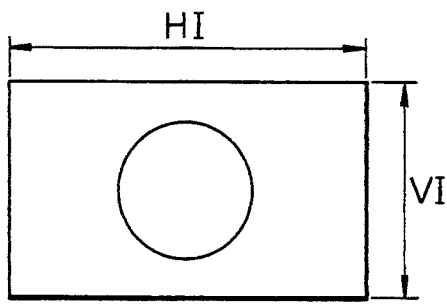
FIG. 3A is an illustration showing an example of image at an input terminal of a video signal source of the multiscreen display circuit, in a video signal processing step in the second embodiment of the multiscreen display circuit of the invention.
Figure 3B:
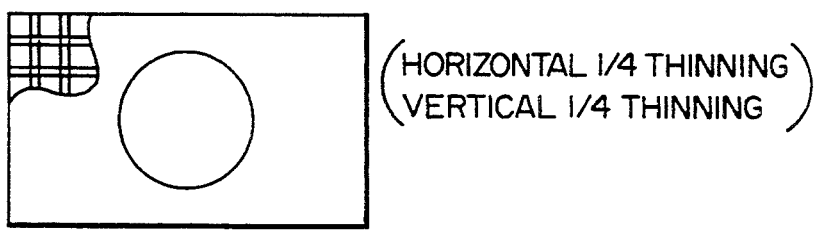
FIG. 3B is an illustration showing a principle of operation of horizontal and vertical thinning circuit portion of the multiscreen display circuit, in a video signal processing step in the second embodiment of the multiscreen display circuit of the invention.
Figure 3C:
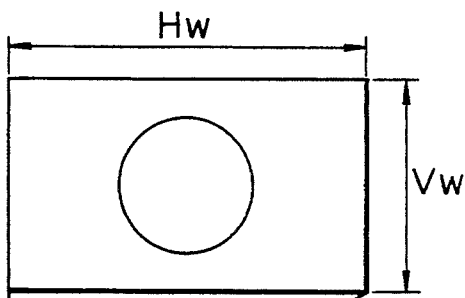
FIG. 3C is an illustration showing image writing in region of an image memory of the multiscreen display circuit, in a video signal processing step in the second embodiment of the multiscreen display circuit of the invention.
Figure 3D:
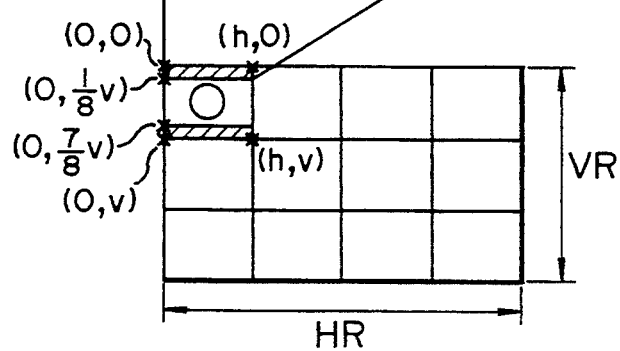
FIG. 3D is an illustration showing a memory space of the image memory of the multiscreen display circuit, in a video signal processing step in the second embodiment of the multiscreen display circuit of the invention.

When the aspect ratio detecting circuit portion 12 discriminate that the video signal source has an aspect ratio of horizontal 4:vertical 3, the memory space of the image memory 5 of FIG. 3D is divided into four sections in the horizontal direction and into three in the vertical direction, and thus results in twelve sub-screens respectively having the aspect ratio of horizontal 4:vertical 3. Therefore, the writing process becomes substantially the same as the former (first) embodiment.

Discussion will be given for the case when the signal switching control portion 13 selects the video signal source which the aspect ratio detecting circuit portion 12 determines has an aspect ratio of horizontal 16:vertical 9, as shown in FIG. 3A. In this case, the thinning ratio is switched to be one fourth, which is lesser than that for the aspect ratio of horizontal 4:vertical 3. FIG. 3B shows the image of one fourth thinning operation of the horizontal thinning circuit portion 3 and the vertical thinning circuit portion 4, at the upper left portion. The image information thus processed fits in the memory space of the image memory 5 corresponding to the sub-screen in the horizontal width but does not fit in the vertical height. Therefore, the write in control circuit portion 9 is controlled so that, after writing in background color to all region of the image memory, horizontal HW and vertical VW region in FIG. 3C illustrating the region to writing in the image in the image memory 5 is writing in the image memory 5 with a delay time corresponding one eighth of the vertical period of the sub-screen.

The operation for reading out the image information is similar to that of the first embodiment. Therefore, all of the images except for the portion which corresponds to the memory space of the image memory 5 currently being updated, are displayed on the images display device 6 as still image. For instance, as shown in FIG. 3D, when the video signal source having the aspect ratio of horizontal 16:vertical 9 is assigned to the sub-screen in the region of (0,0) to (h, v), the image is displaced in the region of (0, $\frac{1}{8}$·v) to (h, $\frac{7}{8}$·v). For the extra upper and lower spaces, the preliminary written gray background color is displayed.

It should be noted that although the foregoing discussion has been given for the case when the image display device 6 has an aspect ratio of horizontal 16:vertical 9, the similar process is equally applicable for the case where the aspect ratio of the image display device is horizontal 4:vertical 3. On the other hand, when the video image source has horizontally elongated aspect ratio other than horizontal 16:vertical 9, the thinning ratio of the horizontal thinning circuit portion 3 is modified so that the thinned image may fit within the horizontal width of the sub-screen of the image memory 5. Then, the thinning ratio of the vertical thinning circuit portion 4 is modified to the equal ratio to the horizontal thinning circuit portion 3 so that all information of the video signal source can be displayed on the sub-screen.

Third Embodiment

The third embodiment of the multiscreen display circuit according to the present invention will be discussed with reference to FIGS. 4A to 4D. Similarly to the foregoing first embodiment, the aspect ratio detecting circuit portion 12 detects the aspect ratio of the video signal source and transfers information indicative of the aspect ratio to the signal switching control portion 13. The signal switching control portion 13 performs switching control for the horizontal thinning circuit portion 3, vertical thinning circuit portion 4 and write in control circuit portion 9 in synchronism with switching control of the video signal source switching means 2.

Figure 4A:
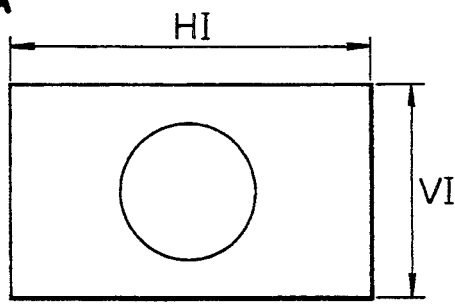
FIG. 4A is an illustration showing an example of image at an input terminal of a video signal source of the multiscreen display circuit, in a video signal processing step in the third embodiment of the multiscreen display circuit of the invention.
Figure 4B:
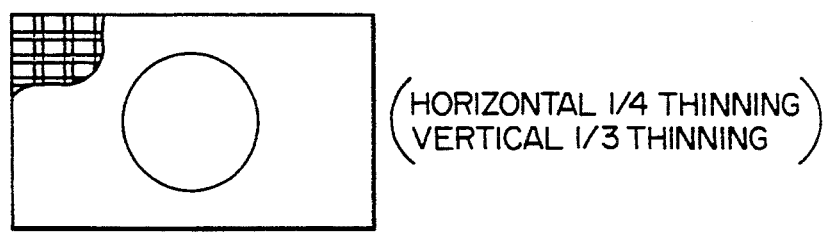
FIG. 4B is an illustration showing a principle of operation of horizontal and vertical thinning circuit portion of the multiscreen display circuit, in a video signal processing step in the third embodiment of the multiscreen display circuit of the invention.
Figure 4C:
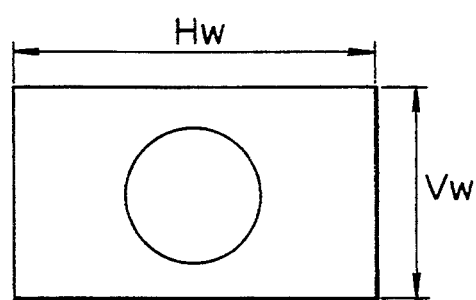
FIG. 4C is an illustration showing image writing in region of an image memory of the multiscreen display circuit, in a video signal processing step in the third embodiment of the multiscreen display circuit of the invention.
Figure 4D:
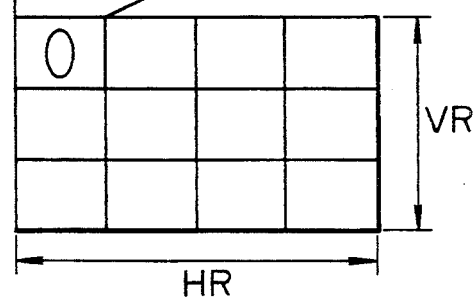
FIG. 4D is an illustration showing a memory space of the image memory of the multiscreen display circuit, in a video signal processing step in the third embodiment of the multiscreen display circuit of the invention.

When the aspect ratio detecting circuit portion 12 determines that the video signal source has an aspect ratio of horizontal 4:vertical 3, the memory space of the image memory 5 of FIG. 4D is divided into four sections in the horizontal direction and into three in the vertical direction, and thus results in twelve sub-screens respectively having the aspect ratio of horizontal 4:vertical 3. Therefore, the writing process becomes substantially the same to the former (first) embodiment.

Discussion will be given for the case when the signal switching control portion 13 selects the video signal source which the aspect ratio detecting circuit portion 12 determines has an aspect ratio of horizontal 16:vertical 9 as shown in FIG. 4A. In this case, the horizontal thinning ratio is switched to be one fourth, which is lesser than that for the aspect ratio of horizontal 4:vertical 3. FIG. 4B shows the image of respective of one fourth and one third thinning operation of the horizontal thinning circuit portion 3 and the vertical thinning circuit portion 4, at the upper left portion. Through the foregoing thinning operation, the memory space of the image memory 5 for the sub-screen of FIG. 4D and the image writing in region illustrated in FIG. 4C have the consistent pixel numbers.

The operation for reading out the image information is similar to that of the first embodiment. Therefore, all of the images except for the portion which corresponds to the memory space of the image memory 5 currently being updated, are displayed on the images display device 6 as still image. It should be noted that although the foregoing discussion has been given for the case when the image display device 6 has the aspect ratio of horizontal 16:vertical 9, the similar process is equally applicable for the case where the aspect ratio of the image display device is horizontal 4:vertical 3. On the other hand, when the video image source has horizontally elongated aspect ratio other than horizontal 16:vertical 9, the thinning ratio of the horizontal thinning circuit portion 3 is modified so that the thinned image may fit within the horizontal width of the sub-screen of the image memory 5. Then, the thinning ratio of the vertical thinning circuit portion 4 is modified to the equal ratio to the horizontal thinning circuit portion 3 so that all information of the video signal source can be displayed on the sub-screen.

Fourth Embodiment

The fourth embodiment of the multiscreen display circuit according to the present invention will be discussed with reference to FIGS. 5A to 5D. Similarly to the foregoing first embodiment, the aspect ratio detecting circuit portion 12 detects the aspect ratio of the video signal source and transfers the information indicative of the aspect ratio to the signal switching control portion 13. The signal switching control portion 13 performs switching control for the horizontal thinning circuit portion 3, vertical thinning circuit portion 4 and write in control circuit portion 9 in synchronism with switching control of the video signal source switching means 2.

Figure 5A:
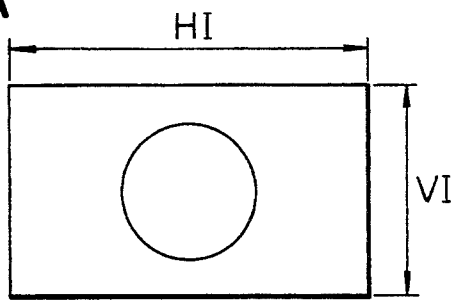
FIG. 5A is an illustration showing an example of image at an input terminal of a video signal source of the multiscreen display circuit, in a video signal processing step in the fourth embodiment of the multiscreen display circuit of the invention.
Figure 5B:
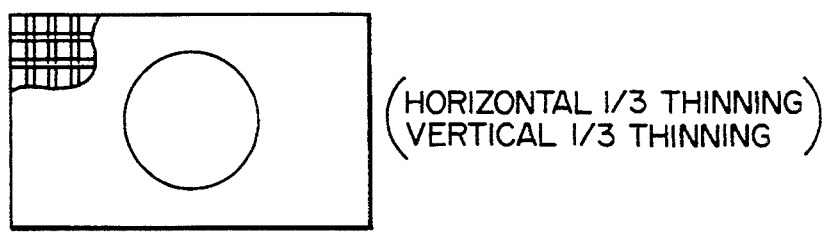
FIG. 5B is an illustration showing a principle of operation of horizontal and vertical thinning circuit portion of the multiscreen display circuit, in a video signal processing step in the fourth embodiment of the multiscreen display circuit of the invention.
Figure 5C:
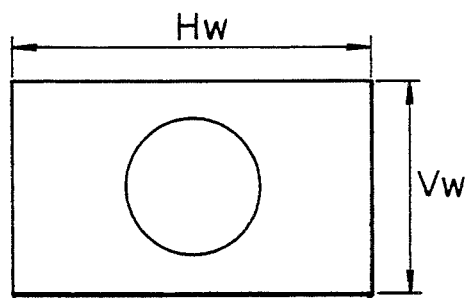
FIG. 5C is an illustration showing image writing in region of an image memory of the multiscreen display circuit, in a video signal processing step in the fourth embodiment of the multiscreen display circuit of the invention.
Figure 5D:
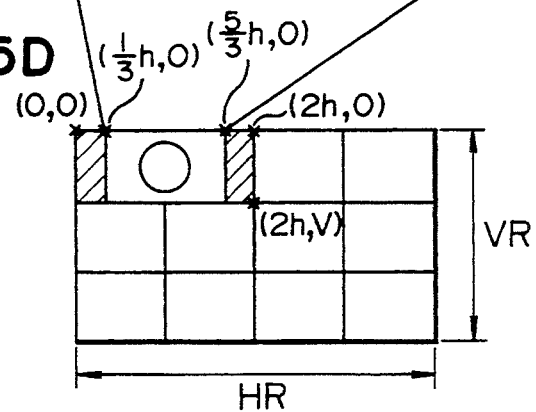
FIG. 5D is an illustration showing a memory space of the image memory of the multiscreen display circuit, in a video signal processing step in the fourth embodiment of the multiscreen display circuit of the invention.

When the aspect ratio detecting circuit portion 12 determines that the video signal source has the aspect ratio of horizontal 4:vertical 3, the memory space of the image memory 5 of FIG. 5D is divided into four sections in the horizontal direction and into three in the vertical direction, and thus results in twelve sub-screens respectively having the aspect ratio of horizontal 4:vertical 3. Therefore, the writing process becomes substantially the same to the former (first) embodiment.

Discussion will be given for the case when the signal switching control portion 13 selects the video signal source which the aspect ratio detecting circuit portion 12 determines it has an aspect ratio of horizontal 16:vertical 9 as shown in FIG. 5A. FIG. 5B shows the image of respective of one third and one third thinning operation of the horizontal thinning circuit portion 3 and the vertical thinning circuit portion 4, at the upper left portion. This thinning operation is same as that for the video signal source having the aspect ratio of horizontal 4:vertical 3. By this thinning operation, the number of pixels in the vertical direction in the memory space of the image memory 5, as illustrated in FIG. 5D, and the image writing region, as illustrated in FIG. 5C, become coincident with each other. However, on the other hand, in the horizontal direction, the image writing region of FIG. 5C has a greater pixel number than that of the memory space of the image memory 5. Therefore, as shown in FIG. 5D, the memory spaces of the image memory 5 for horizontally adjacent two sub-screens are assigned. In this case, the write in control circuit portion 9 is controlled so that the background color is initially written in all regions of the assigned memory space of the image memory 5, and then, the region of horizontal HW and vertical VW of the image writing region for the image memory 5 is written in the horizontally adjacent two sub-screen regions with a delay corresponding one third of the horizontal period of the sub-screen.

The operation for reading out the image information is similar to that of the first embodiment. Therefore, all of the images except for the portion which corresponds to the memory space of the image memory 5 currently being updated, are displayed on the images display device 6 as still image. For instance, as shown in FIG. 5D, when the video signal source having an aspect ratio of horizontal 16:vertical 9 is assigned to the sub-screens in the region of (0,0) to (2h, v), the image is displaced in the region of ($\frac{1}{3}$·h, 0) to (5/3·h, v). For the extra left and right spaces, the preliminary written gray background color is displayed.

It should be noted that although the foregoing discussion has been given for the case when the image display device 6 has an aspect ratio of horizontal 16:vertical 9, the similar process is equally applicable for the case where the aspect ratio of the image display device is horizontal 4:vertical 3. On the other hand, when the video image source has horizontally elongated aspect ratio other than horizontal 16:vertical 9, the thinning ratio of the horizontal thinning circuit portion 3 is modified so that the thinned image may fit within the vertical height of the sub-screen of the image memory 5 so that the horizontally elongated image can be displayed in the full screen of the sub-screen.

Fifth Embodiment

The fifth embodiment of the multiscreen display circuit according to the present invention will be discussed with reference to FIGS. 6A to 6D. Similarly to the foregoing first embodiment, the aspect ratio detecting circuit portion 12 detects the aspect ratio of the video signal source and transfers the information indicative of the aspect ratio to the signal switching control portion 13. The signal switching control portion 13 performs switching control for the horizontal thinning circuit portion 3, vertical thinning circuit portion 4 and write in control circuit portion 9 in synchronism with switching control of the video signal source switching means 2.

Figure 6A:
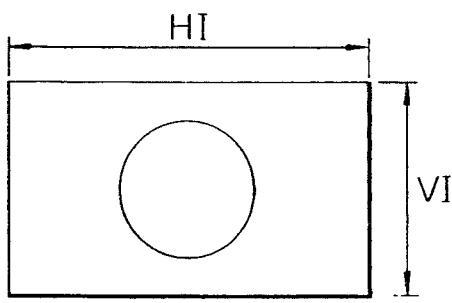
FIG. 6A is an illustration showing an example of image at an input terminal of a video signal source of the multiscreen display circuit, in a video signal processing step in the fifth embodiment of the multiscreen display circuit of the invention.
Figure 6B:
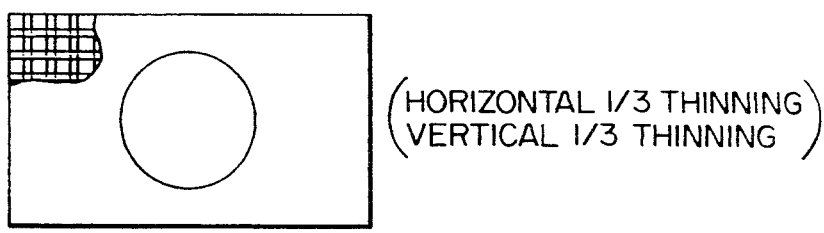
FIG. 6B is an illustration showing a principle of operation of horizontal and vertical thinning circuit portion of the multiscreen display circuit, in a video signal processing step in the fifth embodiment of the multiscreen display circuit of the invention.
Figure 6C:
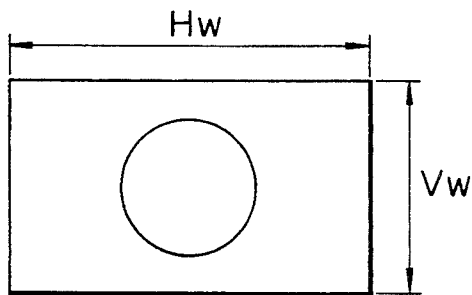
FIG. 6C is an illustration showing image writing in region of an image memory of the multiscreen display circuit, in a video signal processing step in the fifth embodiment of the multiscreen display circuit of the invention.

Discussion will be given for the case when the signal switching control portion 13 selects the video signal source which the aspect ratio detecting circuit portion 12 determines has an aspect ratio of horizontal 16:vertical 9, as shown in FIG. 6A. FIG. 6B shows the image of one third thinning operation of the horizontal thinning circuit portion 3 and the vertical thinning circuit portion 4, at the upper left portion. As seen from FIG. 6D, the image memory 5 is divided into three sections in horizontal direction and into three sections in the vertical direction to define nine sub-screens respectively having the aspect ratios of horizontal 16:vertical 9. Through the foregoing thinning operation, the memory space of the image memory 5 for the sub-screen of FIG. 6D and the image writing in region illustrated in FIG. 6C have the consistent pixel numbers.

Even when the signal switching control portion 13 selects the video signal source which the aspect ratio detecting circuit portion 12 determines that the corresponding video signal source has the aspect ratio of horizontal 4:vertical 3, the one third thinning operation is performed by the horizontal thinning circuit portion 3 and the vertical thinning circuit portion 4. This thinning operation is the same as that for the video signal source having the aspect ratio of horizontal 16:vertical 9. Through this thinning operation, the image information thus processed fits into the memory space of the image memory 6 corresponding to the sub-screen in the vertical height but does not fit in the horizontal width. Therefore, the write in control circuit portion 9 is controlled so that, after writing in background color to all region of the image memory, horizontal HW and vertical VW region in FIG. 3C illustrating the region to writing in the image in the image memory 5 is written in the image memory 5 with a delay time corresponding to one eighth of the horizontal period of the sub-screen.

Figure 6D:
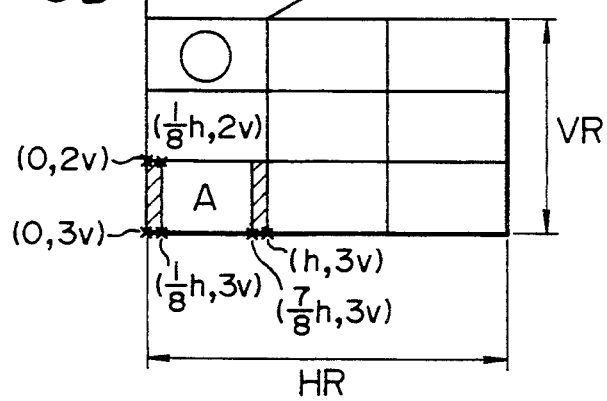
FIG. 6D is an illustration showing a memory space of the image memory of the multiscreen display circuit, in a video signal processing step in the fifth embodiment of the multiscreen display circuit of the invention.
Figure 7:
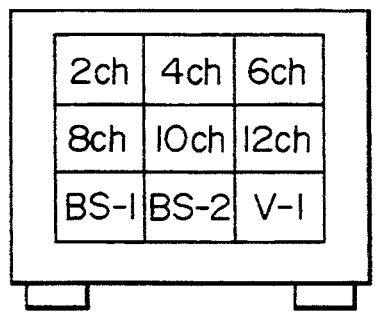
FIG. 7 is an illustration showing concept of a prior art television receiver installing a multiscreen display function for video signal sources.
Figure 8:
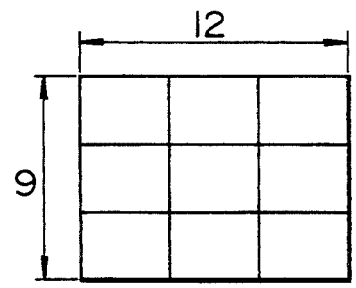
FIG. 8 is an illustration showing an example of division of a display screen of the image display device in the ratio of horizontal 4:vertical 3 in the prior art.
Figure 9:
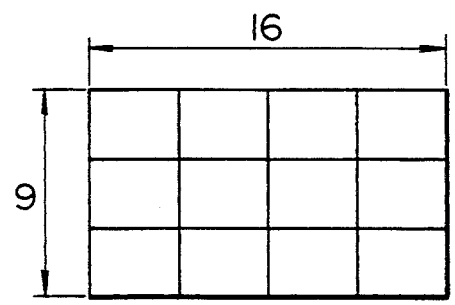
FIG. 9 is an illustration showing an example of division of a display screen of the image display device in the ratio of horizontal 16:vertical 9 in the prior art.

The operation for reading out the image information is similar to that of the first embodiment. Therefore, all of the images except for the portion which corresponds to the memory space of the image memory 5 currently being updated, are displayed on the images display device 6 as still image. For instance, as shown in FIG. 6D, when the video signal source having an aspect ratio of horizontal 4:vertical 3 is assigned for the sub-screen in the region of (0, 2v) to (h, 3v), the image is displaced in the region of ($\frac{1}{8}$·h, 2v) to ($\frac{7}{8}$·h, 3v). For the extra left and right spaces, the preliminary written gray background color is displayed.

It should be noted that although the memory space of the image memory 5 of FIG. 6D is separated into three sections in respective horizontal and vertical directions, such manner of division of the image memory is applicable for N sections in horizontal and vertical directions. In such a case, by setting the thinning ratios for the video signal sources having respective aspect ratios of horizontal 16:vertical 9 and horizontal 4:vertical 3, at 1/N, the subsequent process becomes the same as those set forth above.

As set forth above, the present invention can realize an excellent multiscreen display device for simultaneously displaying a plurality of video signal sources having different aspect ratios. With the respective embodiments set forth above, the following advantages can be achieved.

(1) By dividing the memory space of the image memory into a plurality of sub-screens with an aspect ratio of horizontal 4:vertical 3 corresponding to a plurality of the video image sources, and by switching the write in control circuit portion so as not to write both sides of 1/N of horizontal period in the image memory when a horizontally elongated video image source is detected, the image can be displayed at large size while maintaining circularity of the image, even for the horizontally elongated image. In this case, the operation of the thinning circuits can be held constant irrespective of the detecting output of the aspect ratio detecting circuit.

(2) By dividing the memory space of the image memory into a plurality of sub-screens with an aspect ratio of horizontal 4:vertical 3 corresponding to a plurality of the video image sources, by switching the thinning ratio of the horizontal and vertical thinning circuit portions to be greater when the aspect ratio detecting circuit detects a video signal source having a horizontally elongated aspect ratio, and by switching the write in control circuit portion to provide a delay for 1/N of the vertical period of the sub-screen for writing in the image memory, the image can be displayed while maintaining circularity of the image, even for an horizontally elongated image.

(3) By dividing the memory space of the image memory into a plurality of sub-screens with an aspect ratio of horizontal 4:vertical 3 corresponding to a plurality of video image sources, by switching the thinning ratio of the horizontal thinning circuit portions to be greater when the aspect ratio detecting circuit detects a video signal source having a horizontally elongated aspect ratio, and by switching the write in control circuit portion to provide a delay for 1/N of the vertical period of the sub-screen for writing in the image memory, the image can be displayed while maintaining circularity of the image, even for, a horizontally elongated image. In this case, the operation of the vertical thinning circuit and the write in control circuit can be held constant irrespective of the detecting output of the aspect ratio detecting circuit.

(4) By dividing the memory space of the image memory into a plurality of sub-screens with the aspect ratio of horizontal 4:vertical 3 corresponding to a plurality of video image sources, and by switching the write in control circuit for the image memory so that two horizontally adjacent sub-screen regions of the image memory are assigned when the aspect ratio detecting circuit detects a video signal source having a horizontally elongated aspect ratio, the horizontally elongated video signal source can be displayed on the greater sub-screen than that for the video signal source having an aspect ratio of horizontal 4:vertical 3 with maintaining circularity for full screen of image. In this case, the operations of the thinning circuits becomes constant irrespective of the detecting output of the aspect ratio detecting circuit portion 12.

(5) By dividing the memory space of the image memory into a plurality of sub-screens with the aspect ratio of horizontal 16:vertical 9 corresponding to a plurality of video image sources, and by switching the write in control circuit for limiting the sub-screen region to write in for the central ¾ of the horizontal period when the aspect ratio detecting circuit detects a video signal source having an aspect ratio of horizontal 4:vertical 3, the horizontally elongated video signal source can be displayed on the greater sub-screen than that for the video signal source having an aspect ratio of horizontal 4:vertical 3 with maintaining circularity for full screen of image, and each of the individual video signal sources can be displayed in one sub-screen. In this case, the operations of the thinning circuits becomes constant irrespective of the detecting output of the aspect ratio detecting circuit portion 12.

What is claimed is:

1. A multi-screen display circuit comprising:
   video signal source switching means for selecting a video signal source, for outputting a video signal, from a plurality of video signal sources connected to said video signal source switching means;
   a thinning circuit portion, having a settable thinning ratio, connected to the output of said video signal source switching means, for receiving said video signal from said video signal source switching means and thinning said video signal in accordance with said settable thinning ratio;
   an image memory connected to the output of said thinning circuit portion and including a memory space storing video data;
   image display means, connected to the output of said image memory, for displaying video data received from said image memory;
   an aspect ratio detecting circuit portion for detecting an aspect ratio of video signals of each of said video signal sources and outputting a detection signal; and
   a write in control circuit portion for performing write in control of writing of said video data into sub-screen spaces divided in said memory space of said image memory, wherein:
   said settable thinning ratio of said thinning circuit portion and said write in control circuit portion are controlled in response to said detection signal.

2. A multi-screen display circuit as set forth in claim 1, wherein:
   said write in control circuit portion performs control for dividing the memory space of said image memory into sub-screens having an aspect ratio of horizontal 4:vertical 3 corresponding to a plurality of said video signal sources and for writing in said video data; and
   said write in control circuit portion is switched so that 1/N, where N is a positive integer, of a horizontal period at both ends of the video signal is not written in when said aspect ratio detecting circuit portion detects said video signal to be a horizontally elongated video signal.

3. A multi-screen display circuit as set forth in claim 1, wherein:
   said write in control circuit portion performs control for dividing the memory space of said image memory into sub-screens having an aspect ratio of horizontal 4:vertical 3 corresponding to a plurality of said video signal sources and writing in said video data; and said write in control circuit portion is switched so that said settable thinning ratio of said thinning circuit portion is switched to a lesser ratio than the aspect ratio of horizontal 4:vertical 3 and writing to said image memory is delayed for 1/N, where N is a positive integer, of a vertical period of a respective sub-screen when said aspect ratio detecting circuit portion detects said video signal to be a horizontally elongated video signal.

4. A multi-screen display circuit as set forth in claim 1, wherein:

said write in control circuit portion performs control for dividing the memory space of said image memory into sub-screens having an aspect ratio of horizontal 4:vertical 3 corresponding to a plurality of said video signal sources and writing in said video data; and said write in control circuit portion switches a horizontal thinning ratio to be lesser than the aspect ratio of horizontal 4:vertical 3 when said aspect ratio detecting circuit portion detects said video signal to be a horizontally elongated video signal.

5. A multi-screen display circuit as set forth in claim 1, wherein:

said write in control circuit portion performs control for dividing the memory space of said image memory into sub-screens having an aspect ratio of horizontal 4:vertical 3 corresponding to a plurality of said video signal sources and writing in said video data; and said write in control circuit portion assigns two horizontally adjacent sub-screen regions having the aspect ratio of horizontal 4:vertical 3 of said divided image memory for a video image for which said aspect ratio detecting circuit portion detects to have a horizontally elongated aspect ratio.

6. A multi-screen display circuit as set forth in claim 1, wherein:

said write in control circuit portion performs control for dividing the memory space of said image memory into sub-screens having an aspect ratio of horizontal 16:vertical 9 corresponding to a plurality of said video signal sources and writing in said video data; and said write in control circuit portion is switched so as to limit writing into said image memory to be performed at a central $\frac{3}{4}$ of the horizontal period of the sub-screen region when said aspect ratio detecting circuit portion detects a video signal having an aspect ratio of horizontal 4:vertical 3.

* * * * *